United States Patent [19]
Fujii et al.

[11] Patent Number: 5,603,377
[45] Date of Patent: Feb. 18, 1997

[54] HEAT PIPE AND GAS-LIQUID CONTACTING APPARATUS CAPABLE OF HEAT EXCHANGE USING THE HEAT PIPES AND HEAT EXCHANGER OF GAS-LIQUID CONTACTING PLATE TYPE

[75] Inventors: Masumi Fujii; Taiichiro Suda; Yoshitsugu Hotta; Koichi Kitamura; Yukihiro Jinno; Tomio Mimura; Shigeru Shimojo, all of Osaka; Masaki Iijima, Tokyo; Shigeaki Mitsuoka, Hiroshima, all of Japan

[73] Assignees: The Kansai Electric Power Co., Inc., Osaka; Mitsubishi Jukogyo Kabushiki Kaisha, Tokyo, both of Japan

[21] Appl. No.: 670,719

[22] Filed: Jun. 21, 1996

Related U.S. Application Data

[63] Continuation of Ser. No. 319,049, Oct. 6, 1994, abandoned.

[30] Foreign Application Priority Data

Oct. 6, 1993 [JP] Japan .................. 5-250418
Oct. 6, 1993 [JP] Japan .................. 5-250419

[51] Int. Cl.$^6$ .................................................. F28D 3/02
[52] U.S. Cl. ........................ 165/117; 165/907; 165/116
[58] Field of Search ........................ 165/104.26, 104.21, 165/117, 116, 115, 914, 911, 907

[56] References Cited

U.S. PATENT DOCUMENTS

| | | | |
|---|---|---|---|
| 2,536,840 | 1/1951 | Cornell, Jr. .................. | 165/115 |
| 2,944,966 | 7/1960 | Eickmeyer ..................... | 165/116 |
| 3,095,255 | 6/1963 | Smith ........................... | 165/907 X |
| 3,500,893 | 3/1970 | McReynolds .................. | 165/117 |
| 3,825,064 | 7/1974 | Inoue ........................... | 165/907 X |
| 4,206,807 | 6/1980 | Koizumi et al. ............... | 165/104.21 |
| 4,585,055 | 4/1986 | Nakayama et al. ............ | 165/115 |
| 4,842,052 | 6/1989 | Gershuni et al. ............. | 165/104.26 X |
| 5,195,578 | 3/1993 | Le Goff et al. ............... | 165/914 X |

FOREIGN PATENT DOCUMENTS

| | | |
|---|---|---|
| 777156 | 11/1934 | France . |
| 1399841 | 5/1964 | France . |
| 2416209 | 8/1979 | France . |
| 3610533 | 1/1987 | Germany . |
| 1256793 | 10/1989 | Japan ..................... 165/907 |
| 8332 | 4/1898 | United Kingdom .................. 165/117 |
| 316378 | 12/1928 | United Kingdom .................. 165/115 |
| 0261251 | 3/1988 | United Kingdom . |

OTHER PUBLICATIONS

Patent Abstractsof Japan, vol. 6, No. 131 (C–114) Jul. 17, 1982 & JP-A-57 056 035 (Takeda Kimiko) Apr. 3, 1982.
Patent Abstracts of Japan, vol. 9, No. 84 (M–371) Apr. 13, 1985 & JP-A-59 212 692 (Akutoronikusu KK) Dec. 1, 1984.

*Primary Examiner*—John Rivell
*Assistant Examiner*—Christopher Atkinson
*Attorney, Agent, or Firm*—Jacobson, Price, Holman & Stern, PLLC

[57] ABSTRACT

A heat pipe includes: a pipe barrel; and a large number of fins disposed on the peripheral surface of the pipe barrel at least on either a heat collecting section side or a radiating section side, each of the fins is attached to the pipe barrel on a plane perpendicular to the axis of the pipe barrel, and each of the fins is composed of a metal plate and net-like material adhered to both surfaces of the metal plate.

A heat exchanger of gas-liquid contacting plate type includes: a plurality of heat transfer plates, disposed vertically at certain intervals, defining air flow passages therebetween which allow air to rise, and each of the plates has a heat medium flowing passage thereinside for allowing a heat medium to flow therethrough while the side surfaces of each of the heat transfer plates, which define the air flow passages, are adhered with nets for allowing a liquid to flow downward along the nets and plates.

4 Claims, 7 Drawing Sheets

F I G. 4
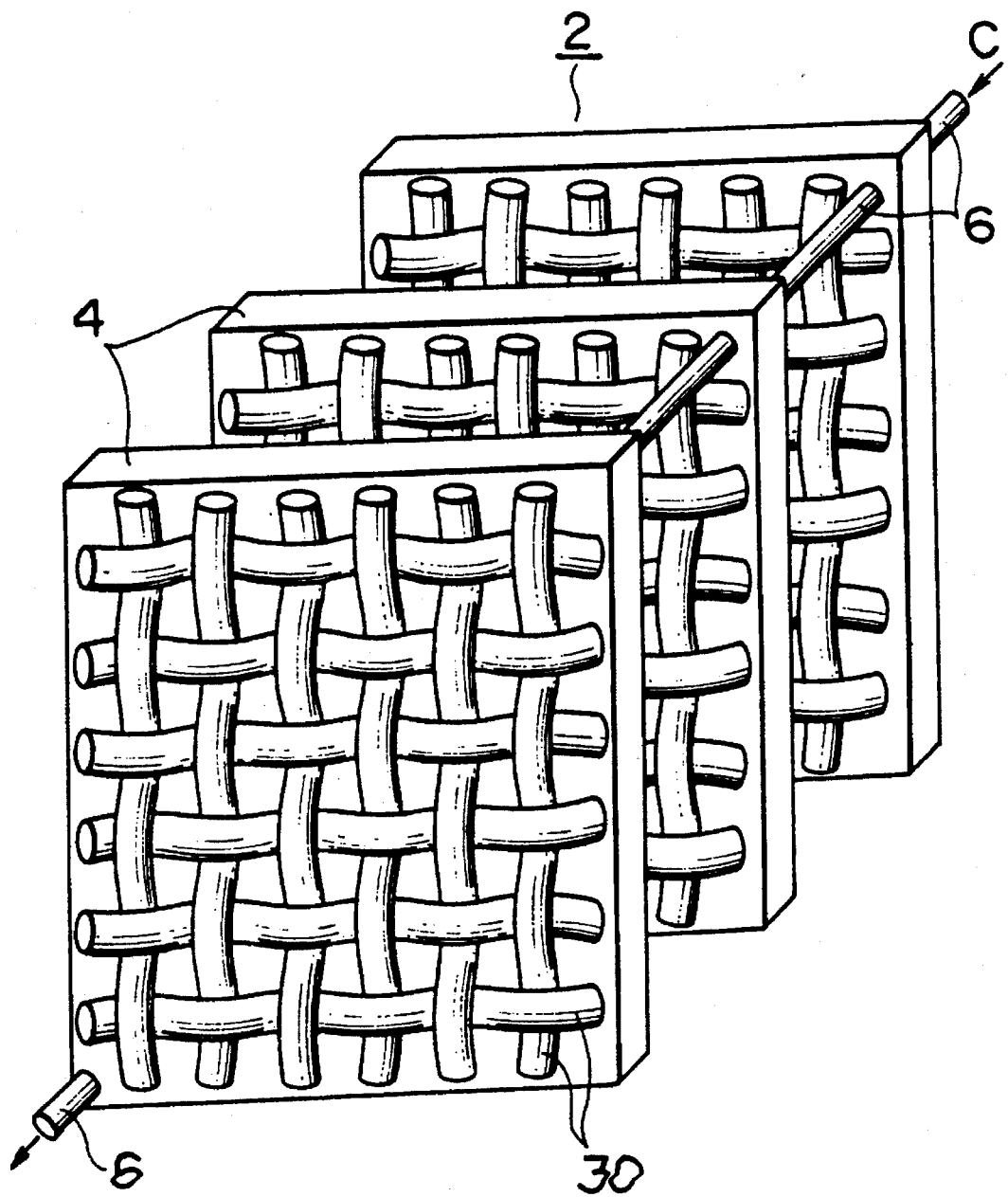

HEAT PIPE AND GAS-LIQUID CONTACTING APPARATUS CAPABLE OF HEAT EXCHANGE USING THE HEAT PIPES AND HEAT EXCHANGER OF GAS-LIQUID CONTACTING PLATE TYPE

This is a continuation of application Ser. No. 08/319,049, filed Oct. 6, 1994 which was abandoned upon the filing hereof.

FIELD OF THE INVENTION AND RELATED ART STATEMENT (1) The present invention relates to a heat pipe (a first configuration of the present invention) and gas-liquid contacting apparatuses (second and third configurations of the present invention) which are able to perform both gas-liquid contact and heat exchange simultaneously by utilizing the heat pipes. More specifically, the present invention relates to a heat pipe with fins of certain surface structure and to gas-liquid contacting apparatuses utilizing the heat pipes. The gas-liquid contacting apparatus of the present invention is able to perform both heat transfer (or exchange) and gas-liquid contact at the same time, so that the apparatus lends itself to applications to various fields of chemical engineering processes.

A heat pipe is able to perform heat transfer between a heat collecting section (evaporation section or high-temperature side) and a radiating section (condensation section or low-temperature side) by utilizing the evaporation and condensation of a heat transfer medium called as an operating liquid which is confined inside the heat pipe. The heat pipe of this kind is capable of conveying a large amount of heat in a short period of time despite that the temperature difference between the two sides is very small, so that this device has been used in various fields.

Heat exchangers with heat pipes applied thereto may be used for heating cold air by utilizing, for example, the heat of exhaust gas. In this case, a large number of heat pipes 41 are put together, as sectionally shown in FIG. 7, inside a case 44 in the form of panels. Provided on the peripheral surface of each heat pipe 41 is fins 42 attached at close intervals so as to enlarge the heat-transfer surface area. The case 44 is parted vertically at an appropriate level by a partitioning plate 43 so that air circulating passage for each air is isolated from the other.

The heat exchanger using the heat pipes is desirably mounted in such a manner that axes of heat pipes are oriented vertically as seen in FIG. 7. But, even if the heat exchanger is mounted so that the heat pipes are oriented horizontally as perspectively shown in FIG. 8, heat transfer inside the heat pipes can be achieved. In the configuration shown in FIG. 8, the case is also separated in the middle into right and left portions by means of the partitioning plate 43 so that air circulating passage for each air is isolated from the other.

In the heat exchanger utilizing the conventional heat pipes, typically, two fluids, different in temperature, are brought into contact with different sides of a heat pipe or heat pipes which are partitioned by the partitioning plate 43 as shown in FIGS. 7 or 8, whereby heat is transferred or exchanged between the two fluids through the heat pipes. In some cases where the heat exchanger is applied to perform heat exchange in the heat collecting portion or radiating portion, a liquid has to be made to flow down from the top in at least one of the two chambers so that the liquid is brought into contact with a gas supplied from the bottom or side of the chamber (gas-liquid contact). In such a case, if the prior art heat exchanger with the heat pipes or the axes thereof being horizontally or approximately horizontally disposed as shown in FIG. 8 is used as it is, the fins conventionally used cannot disperse the liquid over the fin walls enough. As a result, the liquid tends to concentrate on particular spots, thereby increasing the flowing speed of the liquid. In other words, the prior art configuration could not allow the liquid to stay on the surfaces of fins enough long to sufficiently enhance the gas-liquid contact efficiency.

The present inventors hereof have energetically studied the above problem and found the fact that heat pipes provided with fins made up of a metal plate with nets attached onto both surfaces thereof should be markedly effective in increasing the efficiency of gas-liquid contact and that the application of the heat pipes to a gas-liquid contacting apparatus of heat pipe type should impart excellent heat exchange function to the device. Thus, the present inventors could achieve the present invention.

(2) The present invention further relates to a heat exchanger of plate type, and more detailedly to a heat exchanger of plate type which is able to effectively bring a gas into contact with a liquid on the plate surfaces while performing heat exchange (a fourth configuration of the present invention).

In typical chemical plants, it is often needed to efficiently bring a gas into contact with a liquid in a short period of time. This situation is represented by, for example, the case where $CO_2$ (carbon dioxide) gas in a combustion exhaust gas is recollected by an absorbent solution such as amine aqueous solution. In order to fulfill such demands, the applicant of the present invention previously proposed a gas-liquid contacting apparatus which is filled up with a large number of tubular structure fillers, each having a horizontal cross-section of an arbitrary shape and wherein inside walls of the tubular structure is vertically arranged forming gas-liquid contact surfaces so that the gas-liquid contact surfaces may be disposed in parallel with the flow of the gas and wherein the liquid supplied from a site above the fillers is made to flow downward along the gas-liquid contact surfaces while the gas is supplied from a site under the fillers so as to contact the gas with the liquid by feeding the gas from a site under the fillers, the apparatus being characterized in that the gas-liquid contact surface is made up of a plate-like member with net-like members adhered onto the surfaces thereof (Japanese Patent Application Hei-5 No. 59844). But, this proposal does not belong to those publicly known and therefore, is not assumed as the prior art of the present invention.

In the gas-liquid contacting apparatus of the above proposal, in the case where the gas is of the combustion exhaust gas and the liquid is of the amine aqueous solution as stated above, the absorbent liquid is increased in temperature by the heat of reaction as the liquid absorbs $CO_2$ gas, resulting in a decreased reaction rate of absorption. To deal with this, a separately provided heat exchanger (a cooler) was provided for the apparatus to properly adjust the supplied absorbent liquid in temperature. Nevertheless, as flowing downward in the gas-liquid contacting apparatus, the reacting liquid increases in temperature, so that the equilibrium constant for the absorption reaction tends to lower, though the velocity of reaction increases. As a result, only the adjustment in temperature of the absorbent liquid supplied was not effective enough to afford appropriate measure for adjusting the reaction rate. As seen in this example, since, in chemical plants, the gas-liquid contact process typically involves exothermic and/or endothermic reaction, each step requires separate cooler, heater, heat exchanger etc., for the liquid and/or gas used. Further, in view of heat exchange efficiency, alternatively, in consideration of increase in cost for building the plant due to the complication of the plant structure as well as due to the augment of the required space, the improvement of the gas-liquid contacting apparatus has been earnestly desired.

Under consideration of what is discussed above, the present inventors hereof have energetically made studies on the apparatus which is able to perform both gas-liquid contact process and heat exchange process simultaneously and which is advantageous in view of the heat exchange efficiency and space saving, and consequently found a heat exchanger having a certain structure as being extremely effective, to thereby complete the present invention.

SUMMARY OF THE INVENTION (1) The present invention provides a heat pipe (a first configuration of the present invention) and gas-liquid contacting apparatuses (second and third configurations of the present invention) which present an increased efficiency of gas-liquid contact and excellent performances in heat exchanging.

A first feature of the present invention resides in that a heat pipe comprises: a pipe barrel; and at least one or more fins disposed on the peripheral surface of the pipe barrel at least on either a heat collecting section side or a radiating section side, each of the fins being attached to the pipe barrel on a plane perpendicular to the axis of the pipe barrel, and each of the fins is composed of a metal plate and net-like material adhered to both surfaces of the metal plate.

Further, a second feature of the present invention lies in that a gas-liquid contacting apparatus capable of heat exchange, has a large number of the above-described heat pipes disposed together so that the heat collecting section of the heat pipes and the radiating section of the heat pipes are put together, respectively, with the pipe axes being held horizontally or approximately horizontally so that the fins of the heat pipes are positioned vertically or approximately vertically, and a large number of the fins provided on the heat pipes in at least one of the heat collecting section and the radiation section serve as to be gas-liquid contacting wall surfaces for bringing a liquid flowing downward from a site above the fins into contact with a gas fed from a site below the fins or from the side of the fins.

Moreover, in accordance with a third feature of the present invention, in a gas-liquid contacting apparatus capable of heat exchange described above, the large number of fins disposed vertically or approximately vertically are joined with one another forming vertical plates so that the large number of heat pipes, while being kept horizontally or approximately horizontally, are made to penetrate the vertically or approximately vertically formed plates in at least one of the heat collecting section and the radiating section where the pipes are gathered.

In accordance with the first to third configurations of the present invention, the heat pipe not only performs efficient heat exchange, based on the principle of a typical heat pipe, between a fluid in contact with the heat collecting section of the heat pipe and another fluid in contact with the radiating section, but also can carry out a markedly efficient gas-liquid contact on the fins since the vertically or approximately vertically formed fins in at least one of the heat collecting section or the radiating section are each made up of a metal plate with nets adhered to both surfaces of the plate.

(2) In accordance with another aspect of the present invention, a heat exchanger of gas-liquid contacting plate type (a fourth configuration of the present invention) is provided which can perform both the gas-liquid contact process and the heat exchange process simultaneously, and is advantageous in view of heat exchange efficiency and space factor of the apparatus.

A fourth feature of the present invention resides in that a heat exchanger of gas-liquid contacting plate type comprises: a plurality of heat transfer plates, disposed vertically at certain intervals, defining air flow passages therebetween which allow air to rise, and is constructed such that each of the plates has a heat medium flowing passage thereinside for allowing a heat medium to flow therethrough and the side surfaces of each of the heat transfer plates, which define the air flow passages, are adhered with nets for allowing a liquid to flow downward along the nets and plates.

In accordance with the fourth aspect of the present invention, a liquid to be subjected to the gas-liquid contact flows downward along the nets adhered to the side faces of the heat transfer plates. In this while, the liquid flowing downward flows down at slow speeds since many micro regions existing in acute forms between the meshes of the nets and the heat transfer plate make the liquid stay temporarily and since the existence of meshes of the nets causes the liquid flowing downward along the heat transfer plates to spread horizontally, not allowing the liquid to collecting on particular spots. In addition, as a result of the nets being adhered to the heat transfer plates, the surface of the liquid staying at meshes is successively renewed or replaced by the liquid flowing downward, so that the liquid is highly efficiently brought into contact with a gas rising from a site below through passages between the heat transfer plates. In addition, the exothermic or endothermic heat usually accompanied by the gas-liquid contact process can be taken off directly at positions where it is generated by the heat medium inside the heat transfer plates, achieving highly efficient heat exchange. In consequence, it is possible to provide a gas-liquid contacting heat exchanger which presents markedly excellent performances by virtue of both the high gas-liquid contact efficiency and the high heat exchange efficiency.

Further scope of applicability of the present invention will become apparent from the detailed description given hereinafter. However, it should be understood that the detailed description and specific examples, while indicating preferred embodiments of the invention, are give by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4 is a schematic perspective view showing a heat exchanger of gas-liquid contacting plate type in accordance with the present invention;

DETAILED DESCRIPTION OF THE PREFERRED EMBODIMENTS

First of all, embodiments relating to first to third features of the present invention will be described with reference to FIGS. 1 to 3.

Figure 2:
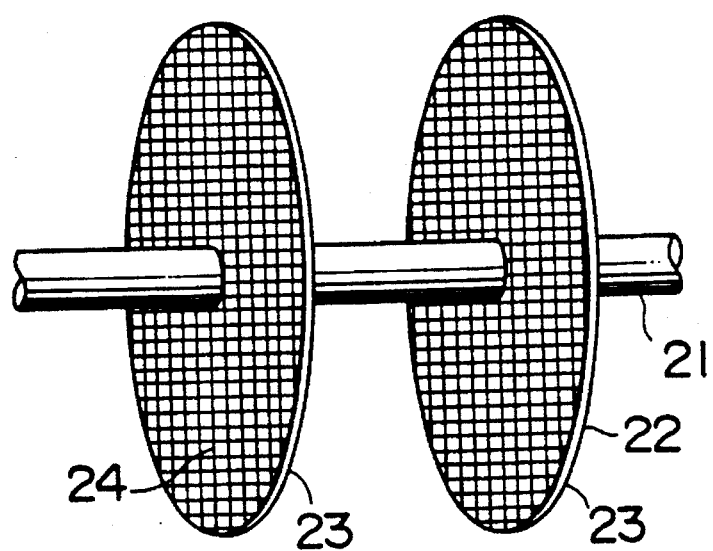
FIG. 2 is an enlarged perspective view of a heat pipe as a constituent of a gas-liquid contacting apparatus of the present invention.

FIG. 2 is an enlarged perspective view showing fins and a part of a heat pipe of the present invention to be applied to a gas-liquid contacting apparatus shown in FIG. 3 described later. In FIG. 2, fins 22 are attached to the barrel side of a heat pipe 21 in such a manner that the fins may be perpendicular to the axis of the heat pipe 21. The fin 22 is made up of a metal plate 23 and nets 24 adhered to both side surfaces of the metal plate 23. As a way of weaving the net 24, any of various weaves inclusive of plane weave, twill weave etc., can be used. The metal plate 23 is preferably made of a material which has a good thermal conductivity and will not be eroded by the gas and liquid to be processed.

Figure 3:
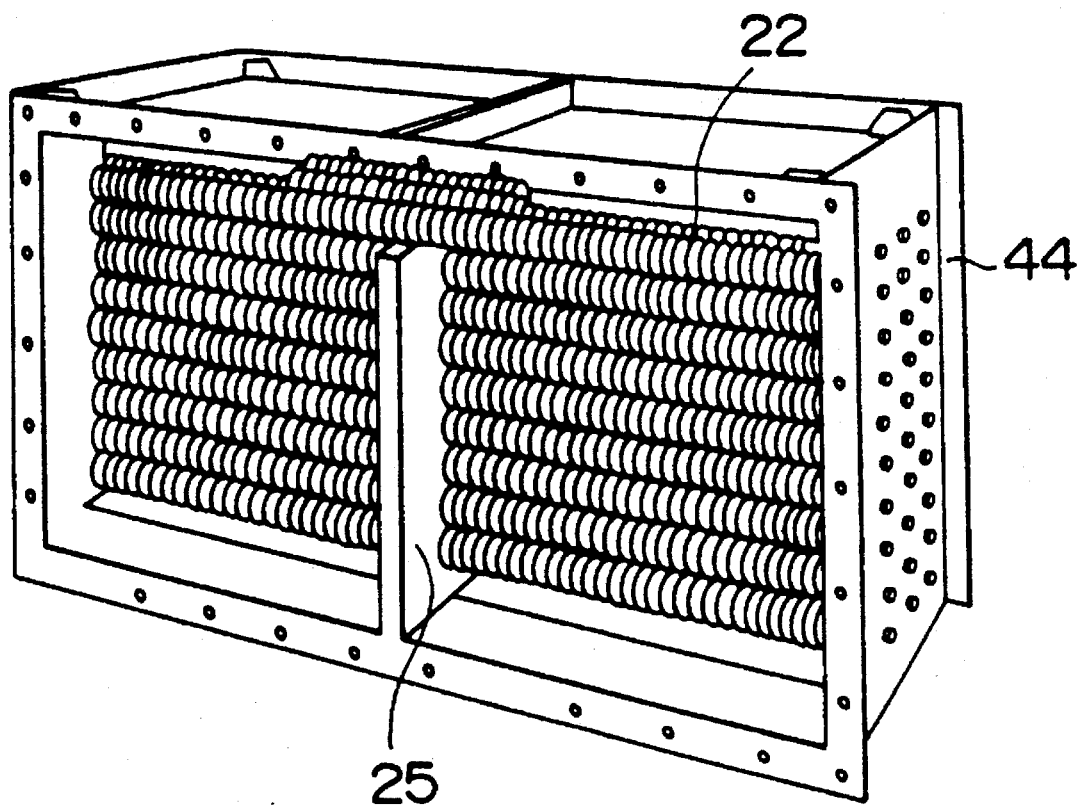
FIG. 3 is a perspective view showing another embodiment of a gas-liquid contacting apparatus of the present invention.

No particular restriction is put on a technique for adhering the net 24 on the plate 23, and any means such as welding or bonding can be utilized, as long as the net will not peel off in the state where the pipe is used in a gas-liquid contacting apparatus that also serves as a heat exchanger, as shown in FIG. 3. The net 24 is preferably made of a material which will not be eroded by the gas and liquid to be contacted with one another. For example, a single-core wire mesh, a single-core plastic net, or any net made up of other materials may be utilized. The net 24 may be disposed so that the wires of the net 24 may be placed at a different angle to the ground. The size of the mesh of the net to be selected is preferably 3 mesh or more, more preferably 8 mesh or more. The heat pipe of the present invention must be provided with the fins at least on either the heat collecting section side or the radiating section side, and is preferably provided with fins made of the aforementioned material on both sides.

Figure 8:
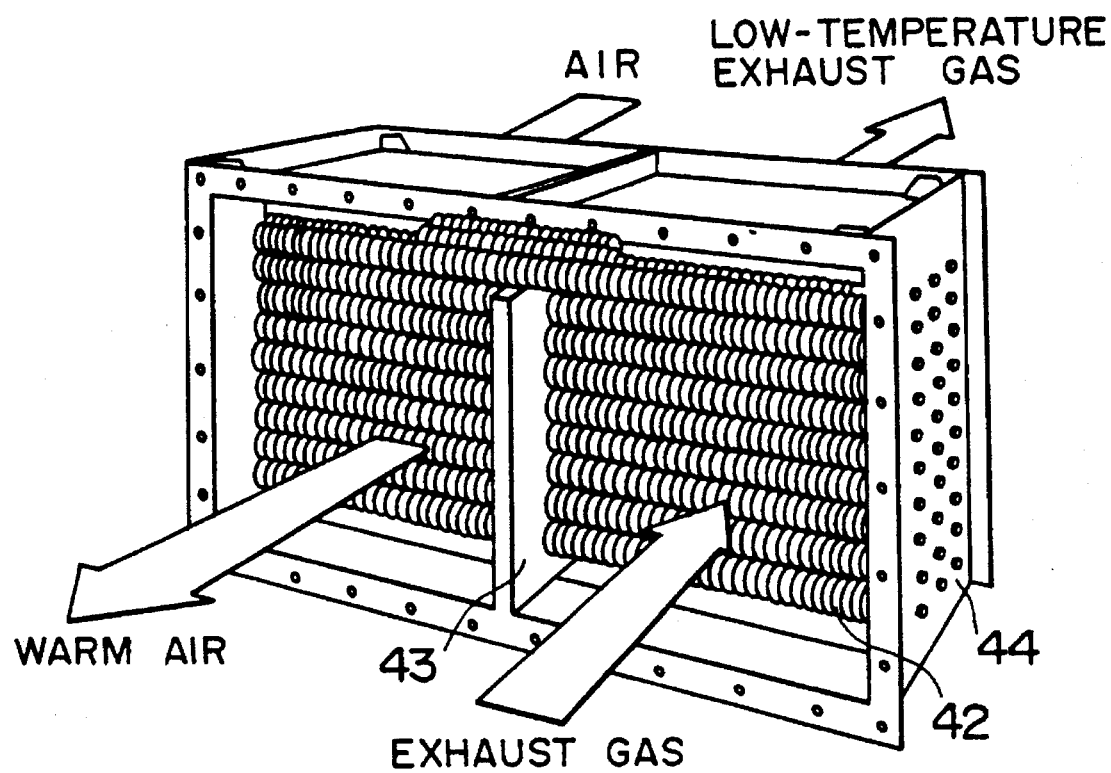
FIG. 8 is a perspective view showing a heat exchanger utilizing conventional heat pipes.

FIG. 3 shows an embodiment of a gas-liquid contacting apparatus of the present invention. The configuration of the apparatus is similar to the prior art apparatus shown in FIG. 8 except the structure of fins. Specifically, in the apparatus of the present invention, a large number of the aforementioned heat pipes with fins are gathered with the pipe axes being approximately horizontal (inclusive of horizontal) so that the fins of the heat pipes may be positioned on an approximately vertical plane (inclusive of vertical plane) while a partitioning plate 25 is provided to separate the heat collecting section and the radiating section. In this case, the fin made of metal plate with nets adhered on both sides thereof serves as gas-liquid contacting wall surfaces for bringing the liquid flowing downward from a site above the fins into contact with the gas supplied from a site below the fins or from the side of the fins.

Figure 1:
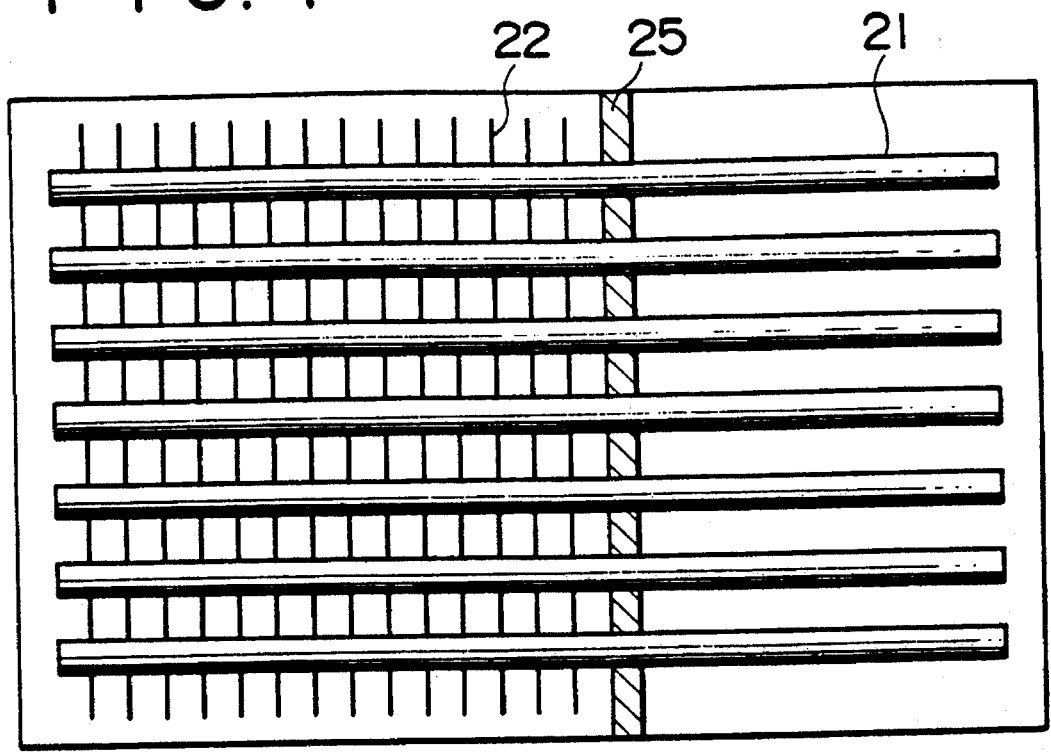
FIG. 1 is a sectional view showing an embodiment of a gas-liquid contacting apparatus of the present invention.

FIG. 1 is a sectional view showing a configuration in which the vertically formed fins in FIG. 2 are joined forming vertical plates. That is, a large number of heat pipes are made to penetrate the thus vertically formed plates at right or approximately right angles so that the thus vertically formed joined fins serve as the contacting surface walls for bringing the liquid flowing downward into contact with the gas.

Referring to FIG. 1, when a high temperature air containing, for example, ethanol is introduced into the gas-liquid contacting apparatus from a bottom side of the apparatus, the air is cooled, as rising, by a large number of the fins attached to a large number of the heat pipes joined, whereby the ethanol component condenses and flows down along the fins joined. In this case, since the surfaces of the fins are composed by metal plates with nets adhered thereto, the condensed ethanol spreads horizontally as flowing down. Therefore, the contacting area of the ethanol with air supplied is enlarged. In consequence, the rising air is cooled down on the surfaces of fins by virtue of heat exchange effect while the condensed ethanol is efficiently brought into contact with the rising air containing ethanol fed from the bottom side for performing gas-liquid contact, whereby the ethanol reevaporates so as to further promote the heat exchange.

A radiating section of heat pipes is formed on the right side of the partitioning plate 25 shown in FIG. 1. That is, the operating liquid inside the heat pipes is cooled and condensed by, for example, low-temperature water that flows down from the upper site, so that the condensed operating liquid moves to the left inside the heat pipe to serve again to cool the high-temperature air containing ethanol. In the case of FIG. 1, no fins are provided for the pipes to be cooled in the radiating section on the right side of the partitioning plate, but the fins shown in FIG. 2 or the joined fins present in the heat collecting section shown in FIG. 1 may be provided.

The heat pipe proposed by the present invention as well as the gas-liquid contacting apparatus using the heat pipes of the present invention can be applied not only to the cooling and condensation process of vapor described as to FIG. 1, but also can be applied widely to various gas-liquid containing apparatuses and processes involving heat exchange for production of chemical products in manufacturing factories. Examples of such processes include distillation, evaporation, gas-absorption, humidity control etc.

According to the heat pipe and the gas-liquid contacting apparatus using the heat pipes as described above as to first to third configurations of the present invention, the liquid flowing down does not go down linearly over the gas-liquid contact surface, but spreads out over the contact surface, so that the staying time of the liquid taken for flowing down becomes longer resulting in markedly improved gas-liquid contacting efficiency. Further, the long stay of the liquid on the contacting surface allows the heat pipes to exchange heat during the gas-liquid contact.

Figure 5:
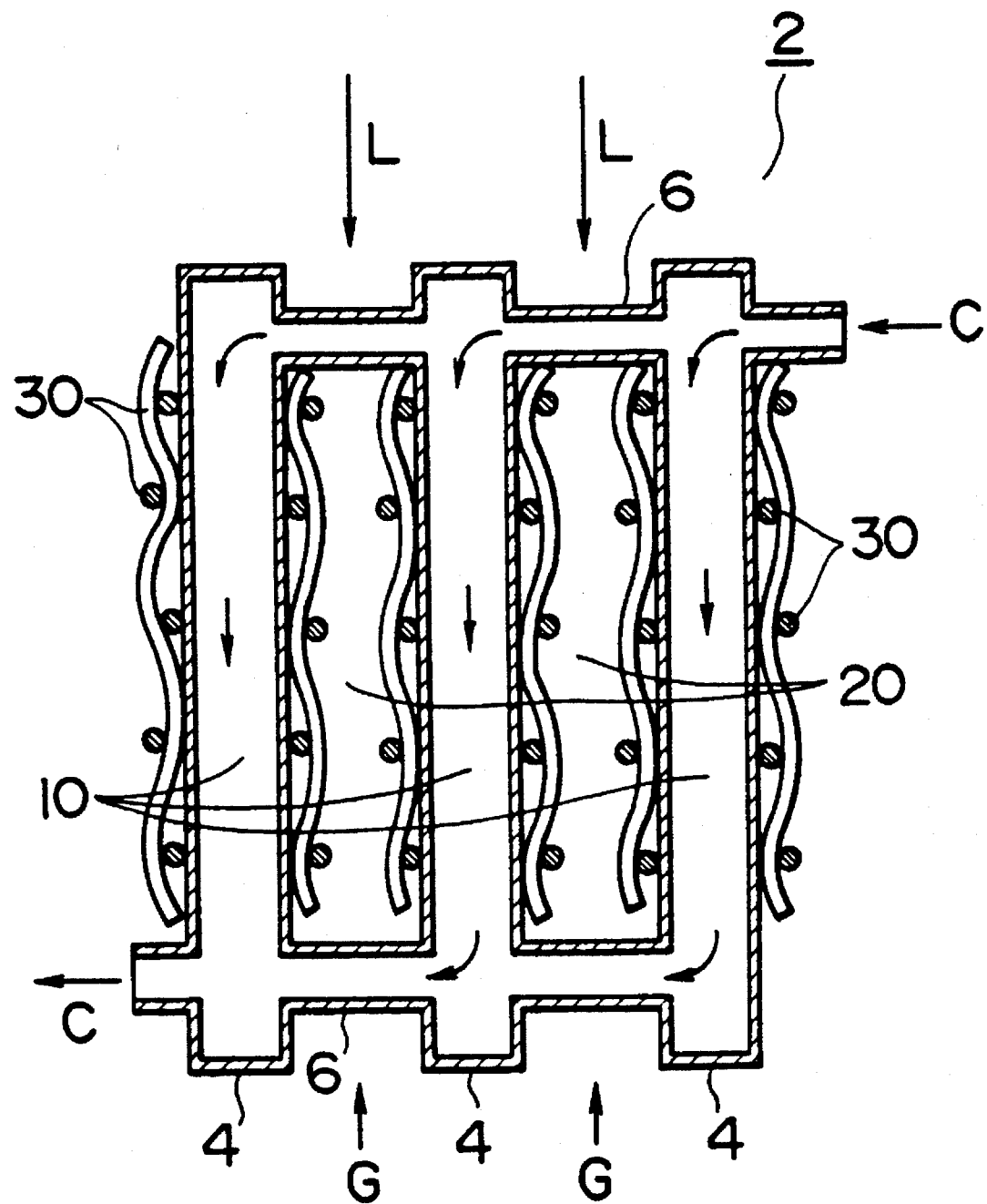
FIG. 5 is a schematic side section of the heat exchanger of FIG. 4.
Figure 6:
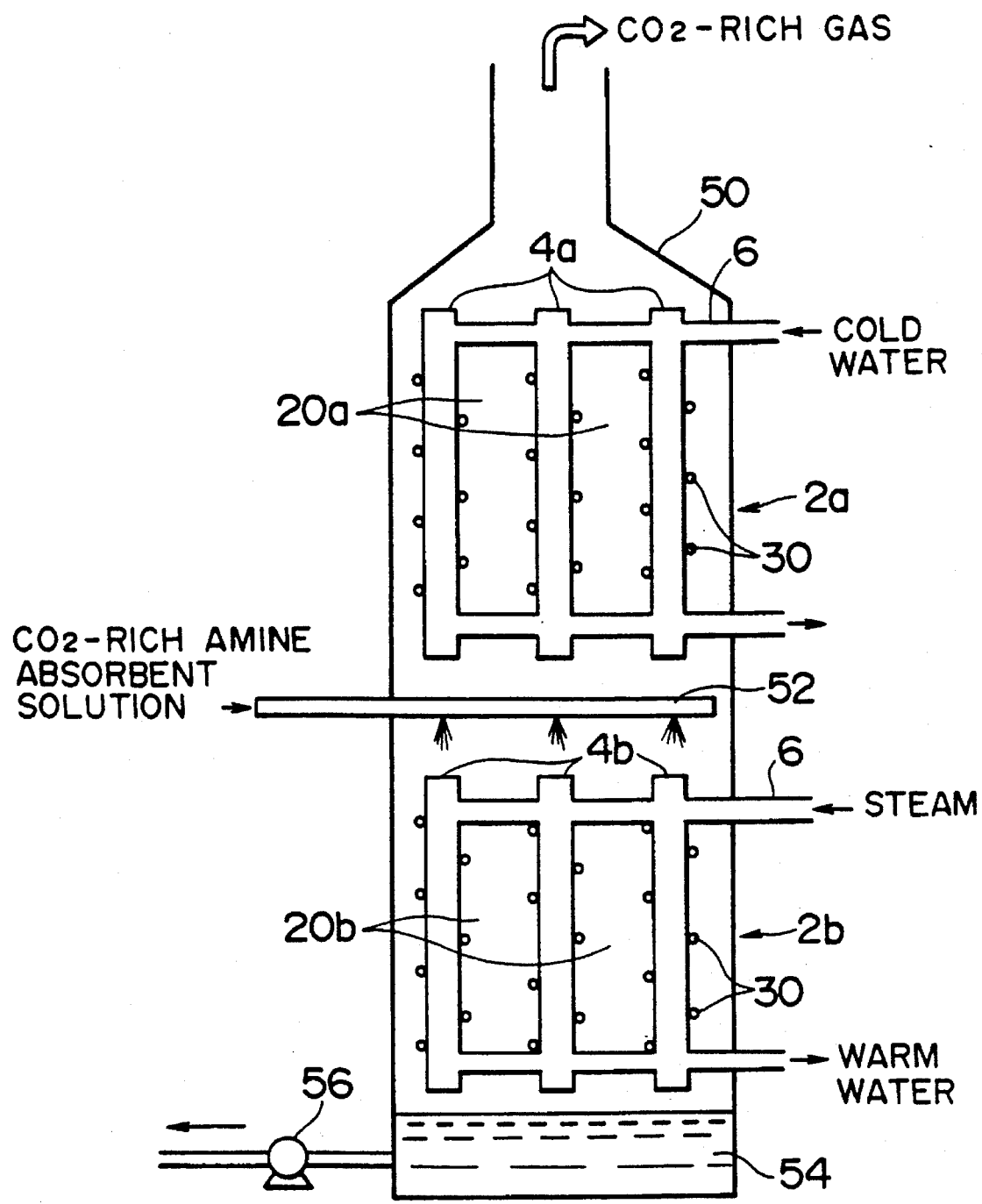
FIG. 6 is a schematic diagram showing an example of applying a heat exchanger of gas-liquid contacting plate type of the present invention to a $CO_2$ regeneration tower.
Figure 7:
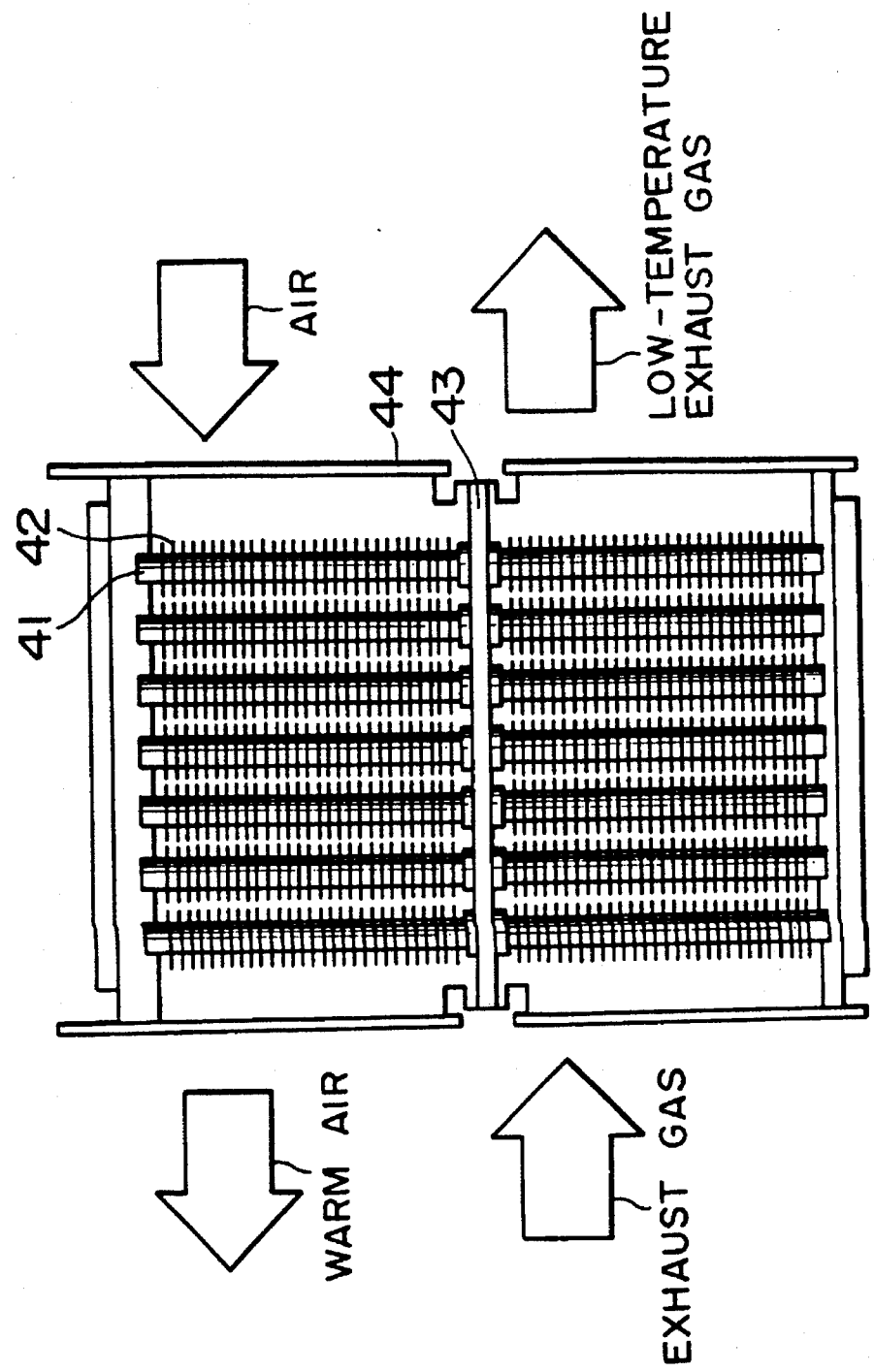
FIG. 7 is a sectional view showing an example of a heat exchanger utilizing conventional heat pipes.

Referring next to FIGS. 4 to 6, a fourth configuration in accordance with an embodiment of the present invention will be described.

Initially, FIGS. 4 and 5 are to be referred. FIGS. 4 and 5 are perspective and side views schematically illustrating a principle of a heat exchanger of gas-liquid contacting plate type. A heat exchanger 2 of gas-liquid contacting plate type in accordance with the present invention is composed of, as shown in figures, a large number of heat transfer plates 4 placed vertically in parallel with one another, passages 10 formed inside the heat transfer plates 4 for introducing a heat medium C, gas passages 20 formed between the heat transfer plates 4, and nets 30 provided on the outside surfaces of the heat transfer plates 4 or on the side surfaces facing the gas passages.

The heat transfer plate 4 is made up of a metal having a good thermal conductivity and has hollow inside forming the passage 10 for the heat medium to be described below. FIGS. 4 and 5 show only three heat transfer plates 4 for simplifying the illustrations, but in practice, a larger number of heat transfer plates 4 are disposed at certain intervals and supported by means of rigidity of pipes 6 or with the help of unillustrated spacers, as required. The insides of these heat transfer plates 4 communicate with each other through the pipes 6, and the heat medium C flows in directions shown by arrows in FIG. 5. In the example illustrated, the pipes 6 are connected so that the heat medium C flows in the same direction (downward) through the inside of all the heat transfer plates 4, but it is possible to provide the pipes 6 so as to alternate the directions of flow of the heat medium C inside the plates 4. The heat medium C is unlikely to leak if joints between the heat transfer plates 4 and the pipes 6 are welded, though welding makes it difficult to disassemble the heat exchanger for maintenance. In general, the heat transfer plates 4 and pipes 6 are jointed by fitting gaskets therebetween and fixing with screws etc., in order to make easy the maintenance and repairs of the apparatus.

The net 30 adhered to the heat transfer plate 4 is preferably made of a material that will not be eroded by the gas and liquid to be subjected to the gas-liquid contact. For example, the net may be formed by a wire mesh, a plastic net etc. The weaving manner of the net 30 illustrated is plain weave, but this weave is not limited and any other various weaves inclusive of twill weave can be used. No particular restriction is put on a technique for adhering the net 30 onto the heat transfer plate 4. The net 30 may be disposed so that the wires of the net 30 may be placed at a different angle to the ground. The size of the mesh of the net to be selected is preferably 3 mesh or more, more preferably 8 mesh or more.

Next, the operation of the thus constructed heat exchanger of gas-liquid contacting plate type will be briefed. In FIG. 5, a gas G to be subjected for the gas-liquid contact rises upward through the air passages 20 formed between heat transfer plates 4 while a liquid L for the gas liquid contact is made to flow down cascade-wise from the upper site of the heat transfer plates 4. Since nets 30 are adhered onto the side faces of heat transfer plates 4, the liquid L, as flowing downward along the side faces of heat transfer plates 4, mainly tends to stay in micro regions defined in acute forms between horizontally extending portions of the net 30 and the side surface of the heat transfer plate. Further, as the liquid flows down over the net 30, the surface part of the staying liquid is successively renewed by newly coming liquid. Thus, since the liquid L spreads horizontally and stays and since the surface part of the liquid is successively renewed, the liquid L is exposed on the surfaces of heat transfer plates 4 and may come into contact at a high-efficiency with the gas G rising. On the other hand, the predetermined heat medium C flows inside heat transfer plates 4 so as to directly heat or cool the liquid L flowing downward along the heat transfer plates 4.

In the case where only a gas containing a condensible substance is made to pass and be cooled while no liquid L is made to flow down from above the heat transfer plates 4, the condensible component in the gas, e.g., water in a combustion exhaust gas is condensed by taking off the condensing latent heat of the condensible component in the gas by way of the heat medium C inside the heat transfer plates 4. The condensed component then adheres to nets 30 as well as onto the side faces of heat transfer plates 4. As increasing in quantity, the condensed water adhered gradually flows downward. The condensed component spreads laterally over vertical faces formed of the nets 30 and heat transfer plates 4, so as to be brought into contact with the high temperature combustion exhaust gas fed from the lower site of the apparatus. In this way, the combustion exhaust gas may be cooled efficiently. The condensed water component in this case finally drains off downward from the heat exchanger of gas-liquid contacting plate type. Heat transfer caused in the gas-liquid contact process involves, in addition to the condensing latent heat, the heat of reaction arising in the gas-liquid contact. The cases where the reaction is exothermic are represented by the aforementioned case in which $CO_2$ component in the combustion exhaust gas is absorbed by the amine solution. In such a case, the generated heat is directly taken off by way of the heat medium C flowing inside the heat transfer plates 4, thereby preventing rise in temperature of the contacting gas and liquid so as to avoid lowering of the equilibrium constant. In this way, a highly efficient gas-liquid contacting process can be achieved. In the case of absorbing reaction, the situation becomes opposite, so heat inside the heat transfer plates 4 is transferred to the gas-liquid contact side.

Next, referring to FIG. 6, description will be made on an example in which the heat exchanger of gas-liquid contacting plate type of the present invention is applied to a regeneration tower for regenerating amine absorbent solution by recollecting $CO_2$ from the amine absorbent solution which has absorbed $CO_2$ (to be referred to as $CO_2$-rich amine absorbent solution hereinbelow). In this example, the same components with those shown in FIGS. 4 and 5 are assigned with the same reference numerals and the nets 30 shown are simplified in the figure. In FIG. 6, two heat exchangers of gas-liquid contacting plate type of the present invention are mounted in upper and lower sites inside a regeneration tower 50. In the upper heat exchanger 2a, low-temperature cooling water is introduced as a heat medium in heat transfer plates 4a which constitute the upper heat exchanger 2a, in order that amine contained in a slight amount in the $CO_2$ gas rising through air passages 20a may be prevented from discharging outside the tower. On the other hand, high-temperature steam is introduced as a heat medium in the heat transfer plates 4b constituting the lower heat exchanger 2b, in order to regenerate the absorbent solution by separating $CO_2$ from the $CO_2$-rich amine absorbent solution. Provided between both the heat exchangers 2a and 2b is a nozzle 52 which sprays over the lower heat exchanger 2b the $CO_2$-rich amine absorbent solution delivered from an unillustrated $CO_2$ absorption tower. An absorbent solution reservoir 54 for receiving regenerated amine absorbent solution having a low concentration of $CO_2$ is provided at the bottom of the regeneration tower 50.

The $CO_2$-rich amine absorbent solution sprayed from the nozzle 52, together with condensed water (to be described later) which comes down from the upper heat exchanger 2a, gradually flows downward along heat transfer plates 4b having nets 30 adhered thereto in the lower heat exchanger 2b. In this situation, high-temperature steam circulates inside the heat transfer plates 4b, so that the $CO_2$-rich amine absorbent solution is heated efficiently. Therefore, as steam is generated from the amine absorbent solution, gaseous $CO_2$ is released together with the steam. The gaseous substances, rising through the air passages 20b, are brought into contact with the $CO_2$-rich amine absorbent solution since the solution is made to flow down continuously from the upper site. As a result, the steam generated and the $CO_2$-rich amine absorbent solution come into contact with one another on heat transfer plates 4b with nets 30 adhered thereto, whereby the $CO_2$ component is further promoted to separate from the steam, both released from the $CO_2$-rich amine absorbent solution. The heat energy required for this process is supplied continuously from the flowing steam inside the heat transfer plates 4b as described above. In consequence, both the gas-liquid contact process and the heat exchange process are simultaneously carried out highly efficiently. The thus regenerated amine aqueous solution with $CO_2$ component removed therefrom is then temporarily reserved in the recollected solution reservoir 54 disposed in the lower portion. Thereafter, the reserved solution is discharged, as required, by a pump 56 into the absorption tower so as to be reused therein as a regenerated amine solution.

On the other hand, the $CO_2$ component released from $CO_2$-rich amine absorbent solution, together with the steam, rises upward through air passages 20a between heat transfer plates 4a in the upper heat exchanger 2a. In this while, the gas passing through air passages 20a is cooled since cooling water is circulated inside the heat transfer plates 4a. Therefore, the steam component condenses on heat transfer plates 4a with nets 30 adhered thereto and flows downward slowly along the plates. The condensed water flowing downward, while exchanging heat with the cooling water inside the heat transfer plates 4a, comes into contact with (or performing gas-liquid contact with) the aforementioned gas rising upward from the lower heat exchanger 2b. Therefore, the gas rising is cooled by the gas-liquid contact whereby the amine component can be prevented from discharging outside the tower. In this way, also in the upper heat exchanger 2a, the gas-liquid contact and the heat exchange are simultaneously achieved highly efficiently. The gas rising upward and passing through the air passages 20a of the heat exchanger 2a is reduced in steam component and delivered to a next step as a $CO_2$-rich gas.

In the conventional regeneration tower, the gas mixture of $CO_2$ and steam delivered from the upper portion of the tower is cooled by a separately provided heat exchanger, in place of the heat exchanger 2a of the present invention and the thus condensed water is sprayed from a nozzle at the top of the tower so as to prevent amine component from discharging outside the tower. Further, in place of the heat exchanger 2b, a part of regenerated amine is extracted from the tower and heated outside the tower to form steam, which is in turn fed to the tower bottom so as to strip off $CO_2$ component with steam (by steam-stripping) from the $CO_2$-rich amine absorbent solution to thereby regenerate the absorbent solution. Thus, the conventional regeneration tower would require a separate heat exchanger and a heater outside the tower, complicating the structure of the apparatus. Moreover, the heat exchanging efficiency was not enough to satisfy the demands. In contrast, the use of the heat exchanger of gas-liquid contacting plate type of the present invention can execute both the gas-liquid contact and the heat exchange simultaneously, so that the structure of the chemical plant can be markedly simplified and it is possible for the apparatus to run at high heat exchange efficiency.

As has been detailed heretofore, according to the heat exchanger of gas-liquid contacting plate type of the present invention (the forth configuration of the present invention), the contacting area between the gas and the liquid flowing downward along the heat transfer plates is increased by virtue of providing the nets. In addition, the nets hold the liquid so as to linger the staying time of the liquid that flows downward, so that the gas-liquid contacting efficiency is enhanced to a great degree with a markedly increased heat exchange efficiency. Further, the configuration of the apparatus can be made compact, so this feature contributes to save the space required for the plant to a great extent.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat pipe comprising:

a pipe barrel; and at least one fin disposed on the peripheral surface of said pipe barrel at least on either a heat collecting section side or a radiating section side, each of said fins being attached to said pipe barrel on a plane perpendicular to the axis of said pipe barrel, being characterized in that said at least one fin is composed of a metal plate and net-like material adhered to both surfaces of said metal plate, said net-like material being defined by a single-core wire mesh or single-core plastic net.

2. A gas-liquid contracting apparatus capable of heat exchange, comprising:

a large number of heat pipes according to claim 1, wherein each of the heat pipes comprises:

a pipe barrel; and at least one fin disposed on the peripheral surface of said pipe barrel at least on either a heat collecting section side or a radiating section side, each of said fins being attached to said pipe barrel on a plane perpendicular to the axis of said pipe barrel, being characterized in that said at least one fin is composed of a metal plate and net-like material adhered to both surfaces of said metal plate, said net-like material being defined by a single-core wire mesh or single-core plastic net;

said large number of heat pipes being disposed together so that the heat collecting section of the heat pipes and the radiating section of the heat pipes are put together, respectively, with the pipe axes being held horizontally or approximately horizontally so that fins of the heat pipes are positioned vertically or approximately vertically, being characterized in that a large number of fins provided on the heat pipes in at least one of the heat collecting section and the radiation section serve as gas-liquid contracting wall surfaces for bringing a liquid flowing downward from a site above the fins into contact with a gas fed from a site below the fins or from the side of the fins.

3. A gas-liquid contacting apparatus capable of heat exchange according to claim 2, wherein said large number of fins disposed vertically or approximately vertically are joined with one another forming vertical plates so that the large number of heat pipes, while being kept horizontally or approximately horizontally, are made to penetrate the vertically or approximately vertically formed plates in at least one of the heat collecting section and the radiating section where the pipes are gathered.

4. A heat exchanger of gas-liquid contacting plate type comprising:

a plurality of heat transfer plates, disposed vertically at certain intervals, defining air flow passages therebetween which allow air to rise, being characterized in that each of said plates has a heat medium flowing passage thereinside for allowing a heat medium to flow therethrough and the side surfaces of each of said heat transfer plates, which define said air flow passages, are adhered with nets for allowing a liquid to flow downward along the nets and plates, said nets being defined by a single-core wire mesh or single-core plastic net.

* * * * *